(No Model.) 4 Sheets—Sheet 1.

D. M. PFAUTZ.
SPRING MOTOR FOR VEHICLES.

No. 282,919. Patented Aug. 7, 1883.

WITNESSES:
David Williams
Hamilton D. Turner.

INVENTOR:
Daniel M. Pfautz
by his Attorney.
Howson & Son (No Model.) 4 Sheets—Sheet 2.

D. M. PFAUTZ.
SPRING MOTOR FOR VEHICLES.

No. 282,919. Patented Aug. 7, 1883.

WITNESSES:
David Williams
Hamilton D. Turner

INVENTOR:
Daniel M. Pfautz
by his Attorneys
Howson & Son (No Model.) 4 Sheets—Sheet 3.

D. M. PFAUTZ.
SPRING MOTOR FOR VEHICLES.

No. 282,919. Patented Aug. 7, 1883.

WITNESSES:
David Williams
Albert Popkins

INVENTOR:
Daniel M Pfautz
by his Attorneys
Howson & Son (No Model.)

4 Sheets—Sheet 4.

D. M. PFAUTZ.
SPRING MOTOR FOR VEHICLES.

No. 282,919. Patented Aug. 7, 1883.

WITNESSES:
David Williams
Hamilton D. Turner

INVENTOR:
Daniel M. Pfautz
by his Attorneys
Howson and Son

UNITED STATES PATENT OFFICE.

DANIEL M. PFAUTZ, OF PHILADELPHIA, PENNSYLVANIA, ASSIGNOR OF FIFTY-TWO ONE-HUNDREDTHS TO JACOB J. GUMPPER, WILLIAM M. MAUL, GEORGE F. FIELDS, AND J. FRANCIS BACON, ALL OF SAME PLACE.

SPRING-MOTOR FOR VEHICLES.

SPECIFICATION forming part of Letters Patent No. 282,919, dated August 7, 1883.

Application filed May 14, 1883. (No model.)

*To all whom it may concern:*

Be it known that I, DANIEL M. PFAUTZ, a citizen of the United States, and a resident of Philadelphia, Pennsylvania, have invented an Improved Spring-Motor for Vehicles, of which the following is a specification.

My invention relates to certain improvements in that class of spring car-motors in which a number of springs are employed, the power of one or more of the springs being applied to the axle, as required. My improvements comprise certain details in the construction and arrangement of the springs and gearing, all as fully set forth hereinafter.

Figure 1:
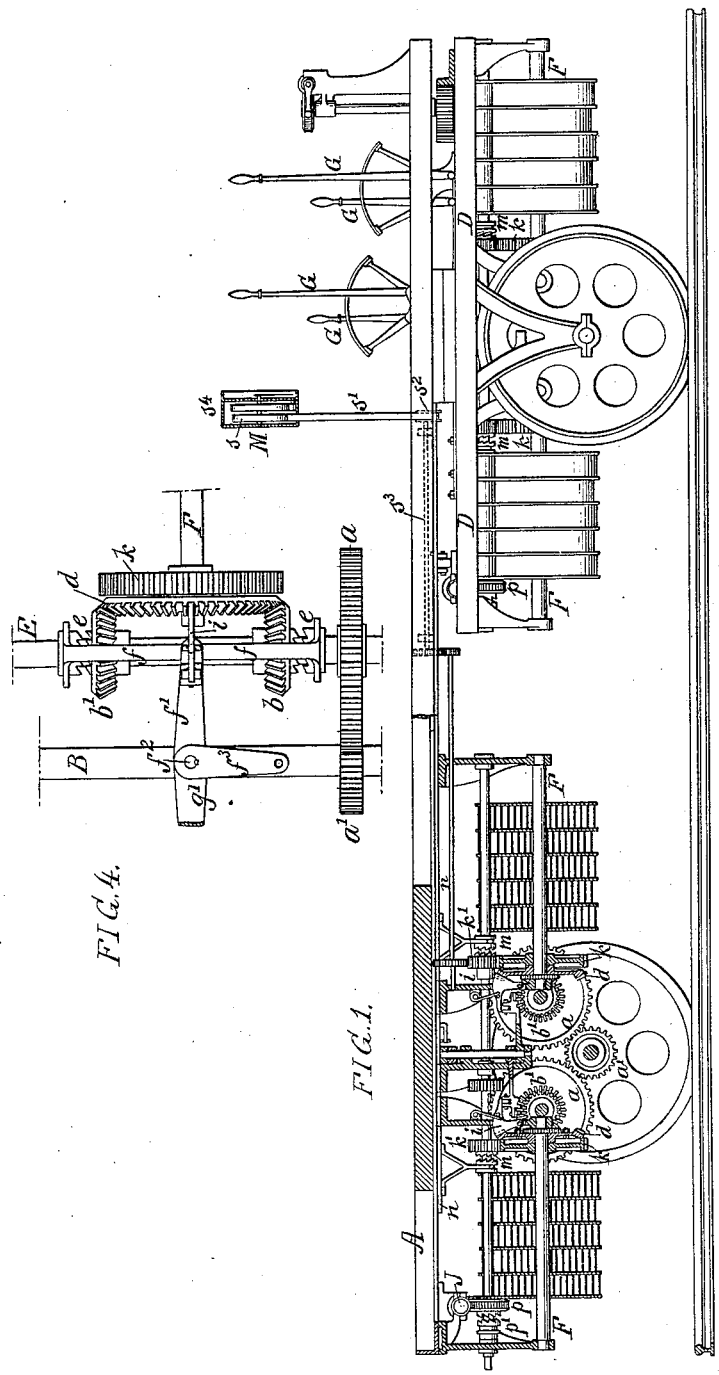
Figure 2:
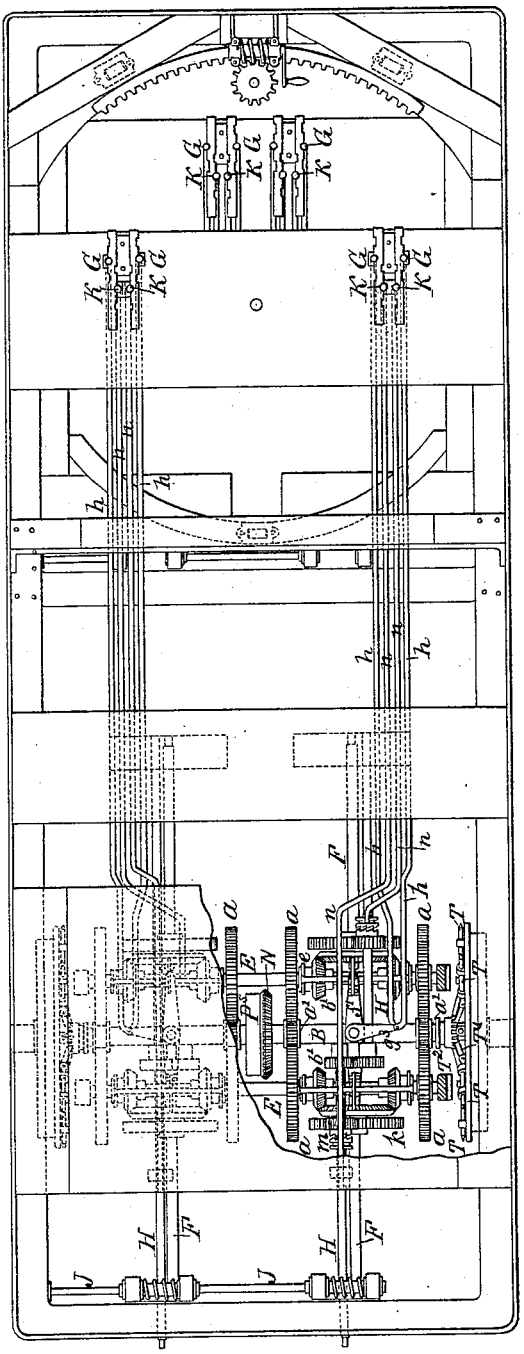
Figure 3:
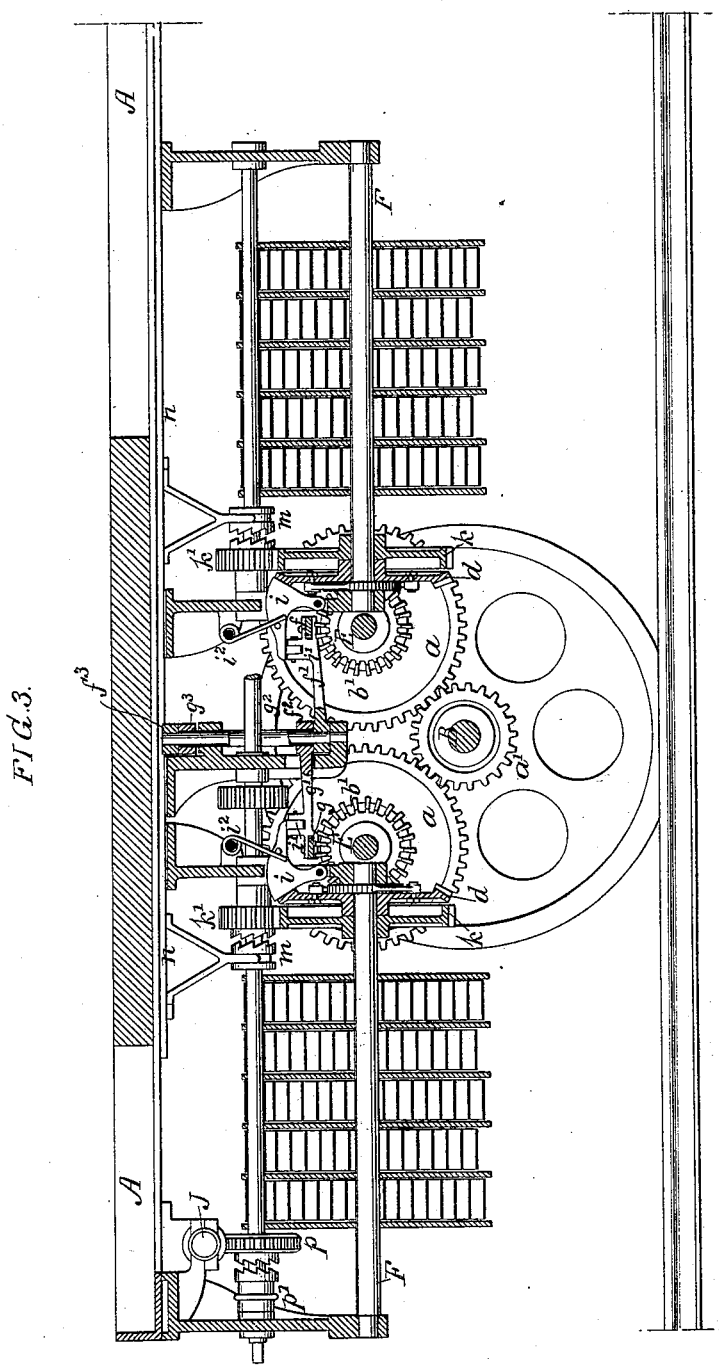
Figure 5:
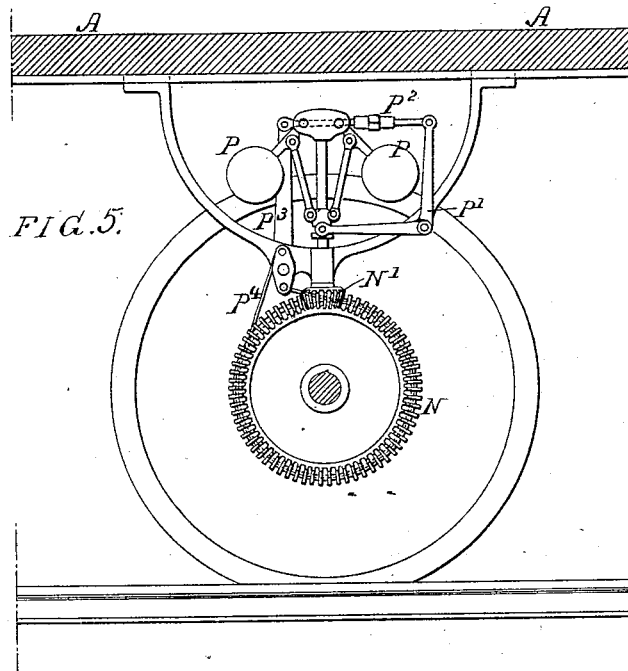
Figure 6:
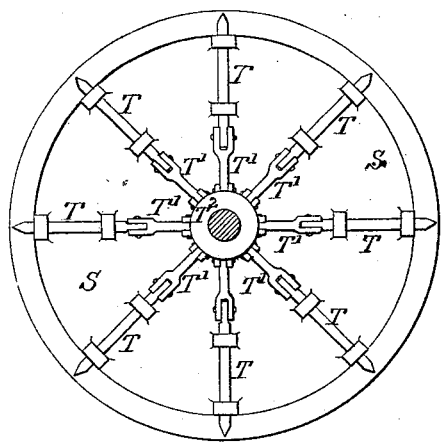
Figure 7:
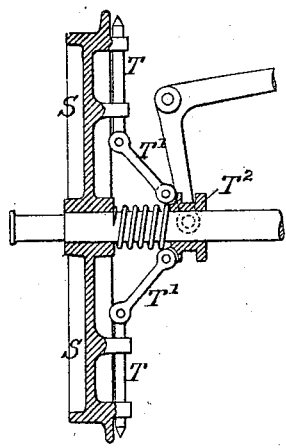

In the accompanying drawings, Figure 1, Sheet 1, is a view partly in longitudinal section and partly in outside view of a car-truck with my improved spring-motor applied thereto; Fig. 2, Sheet 2, a plan view of the same with part of the frame removed; Fig. 3, Sheet 3, a longitudinal section, on a larger scale, of one axle and its driving mechanism; Fig. 4, Sheet 1, a plan view of the reversing and locking gear; and Figs. 5 to 7, inclusive, Sheet 4, detached views of parts of the apparatus.

A represents the frame of a street-car, and B B the axles of the same, the rear axle in the present instance being adapted to fixed bearings on the frame, and the front axle to bearings on a pivoted truck, D, which can be adjusted by rack-and-pinion mechanism to facilitate the turning of curves. The spring-motor devices for each axle are alike, but those for the rear axle are carried by the frame of the car, while those for the front axle are carried by and swing with the pivoted truck. I have illustrated in detail the mechanism of the rear axle. On each side of this axle B is a transverse shaft, E, which carries spur-wheels $a$, gearing into pinions $a'$ on the axle.

F are the longitudinal spring-shafts, four of which are shown in the present instance, two for each shaft E, the latter shafts being geared to the spring-shafts by means of bevel-pinions $b$ $b'$, arranged on opposite sides of the center of the spring-shafts, and gearing into bevel-wheels $d$ on said shafts. The pinions $b$ $b'$ can be secured to or released from the shafts E by means of clutches $e$, so that the running of the car can be readily governed. Thus when the pinions $b$ are clutched to the shafts and the pinions $b'$ are free therefrom, the recoil of the springs acting through the medium of the shafts F and E upon the axle B will cause the forward movement of the car; and when the pinions $b'$ are clutched to the shafts and the pinions $b$ free therefrom, the car will be driven rearward; while when both pinions are free from the shafts, the latter will not be actuated and the car will be stopped or allowed to run by gravity when on a grade. The momentum of the car, when on a down grade, may be used to wind up the springs by throwing the pinions $b'$ into gear with the shafts E. The clutches $e$ on the front shaft E are operated by bars $f$, connected to arms $f'$ on vertical shafts $f^2$, adapted to suitable bearings on the frame A; and the clutches of the rear shaft E are operated by similar bars, $g$, carried by arms $g'$ on tubular shafts $g^2$, surrounding the shafts $f^2$. The shafts $f^2$ and $g^2$ carry other arms, $f^3$ and $g^3$, which are connected by means of rods $h$ to levers G on the front platform of the car, these levers being hung to notched standards, so that they can be retained in either of the three positions necessary for the proper operation of the clutches $e$.

In order to prevent the spring-shafts from rotating when both of the pinions $b$ $b'$ geared thereto are free from the shaft E, I use locking-plates $i$, pivoted to the bearings of the shafts F, and adapted to engage with the teeth of the bevel-wheels $d$ on said shafts. On the arms $f'$ and $g'$ are rollers $i'$, and when said arms are in the intermediate position assumed when both pinions $b$ $b'$ are free from the shafts E, the locking-plates will be under the control of the said rollers, and will be caused to engage with the teeth of the bevel-wheels $d$; but when the arms are moved in one direction or the other, so as to throw one or other of the pinions $b$ $b'$ into gear, the rollers will be removed from contact with the plates, and the latter will be retracted by the springs $i^2$, so as to release the wheels $d$.

To each spring-shaft F, in the rear of the bevel-wheel $d$, is secured a spur-wheel, $k$, gearing into a pinion, $k'$, on a winding-shaft, H.

The front springs are, in the present instance, wound in a direction the reverse of the rear springs, and the winding shafts for the front springs are connected by spur-gearing to the shafts for the rear springs, and are operated by worm-gearing from a transverse shaft, J, to which power is applied from an engine when the car arrives at the depot or other convenient point. The pinions $k'$ are loose on the shaft H, but can be secured to or released therefrom by clutches $m$, operated by rods $n$ connected to levers K on the front platform, so that by properly manipulating the levers each spring-shaft can be thrown into gear with the winding mechanism, or can be released therefrom when the spring is fully wound.

The bevel-wheels $d$ are not secured to the spring-shafts, but are connected thereto through the medium of pawl-and-ratchet mechanism, so that in winding up the springs the bevel-wheels will not be rotated, that movement only of the shaft F which is due to the recoil of the springs being transmitted to the bevel-wheels.

The worm-wheels $p$ are loose on the shafts H, and clutches $p'$ are used in connection therewith, so that the shaft H can be disconnected from the shaft J when it is desired to wind up the springs by hand, a ratchet-lever being applied to the end of the shaft H for this purpose.

In order that the exact amount of power available at any time may be known to the driver of the car, I provide each spring-shaft with an indicator, M, which will show at a glance the condition of the spring. This indicator is shown in Fig. 1, and consists of a casing with a graduated dial-plate and pointer, the latter being carried by a shaft to a drum, $s$, on which is attached one end of a belt, $s'$, the opposite end of the same being attached to a drum, $s^2$, on a shaft, $s^3$, driven by spur-gearing from one of the spring-shafts, either by engagement with the winding-pinion $k'$, as shown, or by other suitable means. As the spring-shaft is turned to wind up the springs, the belt $s'$ is wound on the drum $s^2$ and unwound from the drum $s$, so that the pointer of the indicator is caused to turn to indicate the extent to which the springs are wound. As the springs unwind, the movements are reversed, a coiled spring, $s^4$, restoring the pointer to zero.

To prevent an undue increase in the speed of the car in the event of the excessive application of power to the axles, I use an automatic brake. (Shown in Fig. 5.)

On the axle is a bevel-wheel, N, gearing into a pinion, N', on the spindle of an ordinary centrifugal ball-governor, P, the sleeve of which acts upon one arm of a bell-crank lever, P', the other arm of the latter being connected by a rod, $P^2$, to the actuating-lever $P^3$ of a friction-brake strap, $P^4$, adapted to a brake-wheel, $P^5$, on the axle adjacent to the wheel N. By this means an undue increase of speed will cause the application of the brake, and in order that the maximum of speed may be readily governed, I make the connecting-rod $P^2$ adjustable, as shown, so that the brake may be applied at any desired speed of the governor.

In motors in which power is applied to the axle difficulty is experienced owing to the loss of traction resulting from a wet or icy track. To overcome this difficulty I provide the inside of each wheel S with a number of radially-guided rods, T, pointed at the outer ends and connected at the inner ends by links T', to a sleeve, $T^2$, sliding on the shaft, and controlled by the driver through the medium of any suitable system of rods and levers. On thrusting the sleeve toward the wheel the pointed rods will be caused to move outward, so as to project beyond the rim of the wheel and form spurs to increase the grip of the wheel, the rods being withdrawn on retracting the sleeve. (See Figs. 6 and 7.)

I have shown in the drawings a series of narrow flat springs on each spring-shaft; but a single flat spring on each shaft may be used; or a spiral spring may be employed in place of a flat spring.

By the use of the intermediate shafts, E, the number of turns of the axle for each turn of the spring-shafts can be materially increased, and the bevel-gears, clutches, &c., are carried by said shafts E, to which they can be more readily applied than to the axle.

I have described my improved motor as applied to a street-car; but it will be evident that it can be applied to other vehicles.

By the use of longitudinal spring-shafts I am enabled to employ a much greater number of springs than when the latter are secured to transverse shafts, for a number of such longitudinal shafts may be arranged side by side, both in front and rear of the axle, economy and subdivision of power, due to the use of a great number of small light springs, being thus insured.

I claim as my invention—

1. The combination of the axle, a series of longitudinal spring-shafts, an intermediate transverse shaft, E, and gearing whereby the movement of the spring-shafts is transmitted to the axle through the medium of said intermediate transverse shaft, as set forth.

2. The combination of the axle of the vehicle, a series of longitudinal spring-shafts geared to said axle, winding-shafts H, means for clutching said shafts to and releasing them from the spring-shafts, and mechanism, substantially as described, whereby said winding-shafts can be driven by power, as set forth.

3. The combination of the axle and spring-motor devices therefor, a friction-brake wheel on said axle, a strap adapted to said wheel, and a centrifugal governor driven from the axle and connected to the brake-strap, as set forth.

4. The combination of the axle and spring-motor devices therefor, the friction-brake wheel and its strap, and the centrifugal governor driven from the axle and connected to the brake-strap by mechanism having an adjustable rod, $P^2$, as set forth.

5. The combination of the car-frame A, having a swinging front truck, D, and mechanism for adjusting the same with the rear axle, and its spring-motor devices carried by the frame A, and the front axle and its spring-motor devices carried by the swinging front truck, as set forth.

6. The combination of the spring-shaft having a bevel-wheel $d$, the pinions $b$ $b'$, and clutches $e$, the shifting-rod, and the lever $i$, adapted to engage with the wheel $d$ and controlled in its movement in one direction by the spring $i^2$, and in the other direction by the shifting-rod, as set forth.

In testimony whereof I have signed my name to this specification in the presence of two subscribing witnesses.

DANIEL M. PFAUTZ.

Witnesses:
HARRY L. ASHENFELTER,
HARRY SMITH.